United States Patent [19]

Poniatowski

[11] Patent Number: 5,129,291
[45] Date of Patent: Jul. 14, 1992

[54] INTERNAL WRENCH-ADAPTER FOR ROTATING AN OIL-FILTER PLUG

[76] Inventor: Stanley Poniatowski, 9227 S. Crescent Ct., Oak Lawn, Ill. 60453

[21] Appl. No.: 696,838

[22] Filed: May 7, 1991

[51] Int. Cl.$^5$ .............................................. B25B 23/08
[52] U.S. Cl. .................................... 81/446; 81/443
[58] Field of Search .............. 81/443, 446, 450, 3.48, 81/3.49

[56] References Cited

U.S. PATENT DOCUMENTS

| | | | |
|---|---|---|---|
| 705,724 | 7/1902 | Upson | 81/446 |
| 806,398 | 12/1905 | Crawford | 81/443 |
| 1,672,053 | 6/1928 | Brown | 81/442 |
| 2,038,262 | 4/1936 | Bernhardt | 81/446 |
| 2,088,785 | 8/1937 | Gifford | 81/446 |
| 2,468,867 | 5/1949 | Collins | 81/442 |
| 2,800,043 | 7/1957 | Young, Jr. | 81/446 |
| 2,909,090 | 10/1959 | Moore | 81/176.15 |
| 2,955,497 | 10/1960 | Izzo | 81/446 |
| 3,369,431 | 2/1968 | Srsen | 81/442 |
| 3,675,516 | 7/1972 | Knudsen et al. | 81/176.15 |
| 4,193,328 | 3/1980 | Jezek et al. | 81/72 |
| 4,335,632 | 6/1982 | Irwin et al. | 81/446 |
| 4,499,799 | 2/1985 | Bordages | 81/443 |

Primary Examiner—Frank T. Yost
Assistant Examiner—Hwei-Siu Payer
Attorney, Agent, or Firm—Milton S. Gerstein

[57] ABSTRACT

A wrench-adapter for rotating a plug of a casing for an in-the-pan type of oil filter. The wrench-adapter adapter has a tubular main housing that is telescopingly received in the plug with a portion of the main housing projecting outwardly of the plug. A plurality of pivotally mounted jaw-members are mounted in the outer circumferential surface of the main housing with each having a portion projecting into the hollow interior of the main housing, and a portion projecting away. An actuator-member causes partial rotation of the jaw-members relative to the main housing in both the clockwise and counterclockwise directions, in order to bring one of the sharpened corners of each the jaw-member into contact with the annular interior surface of the main housing of the plug. The actuator-member has a central hollow interior for receiving therein the head projecting from the recessed front surface of the plug.

8 Claims, 2 Drawing Sheets

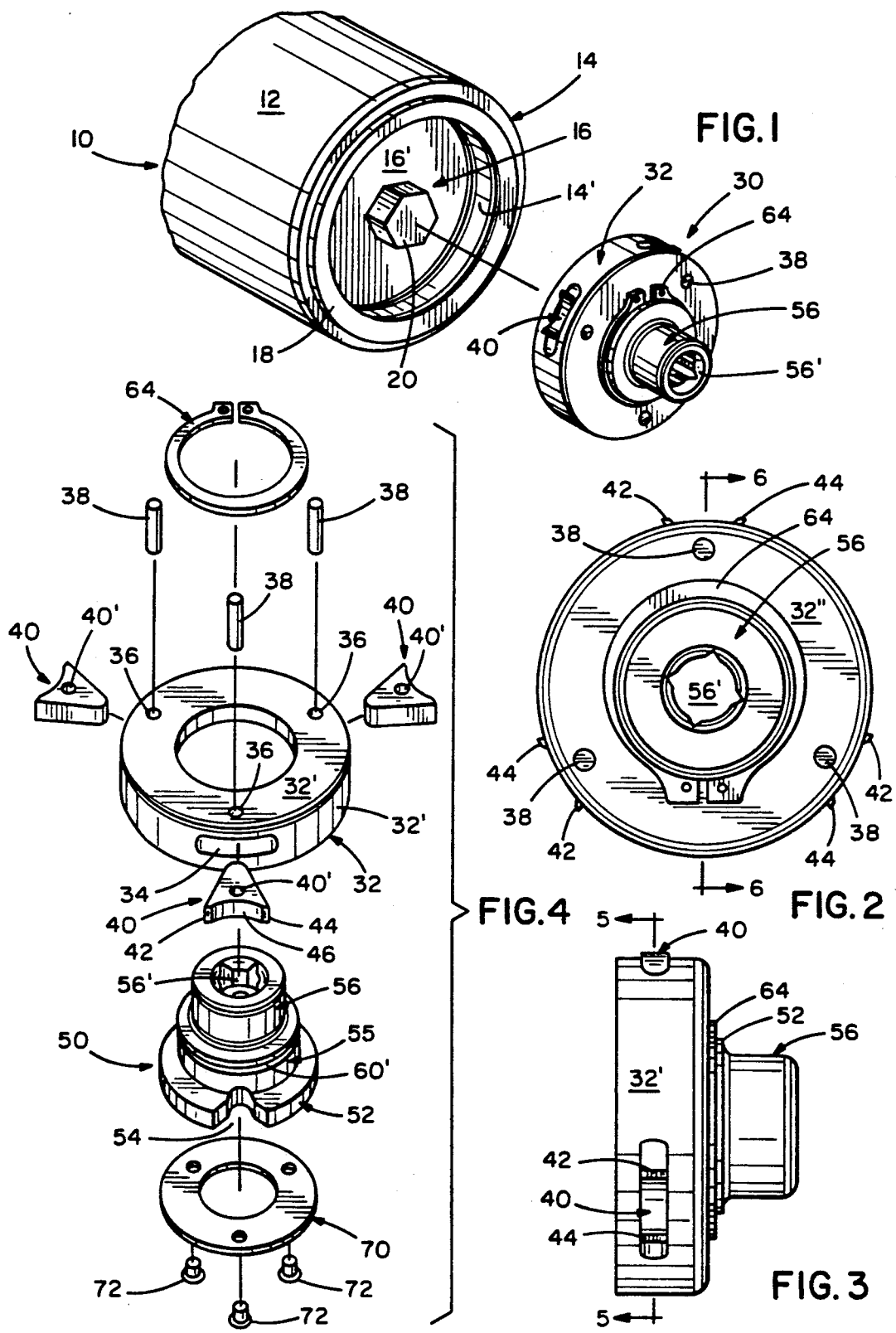

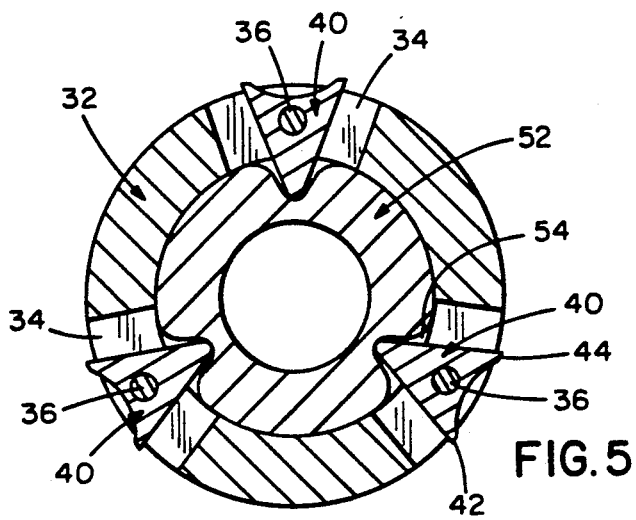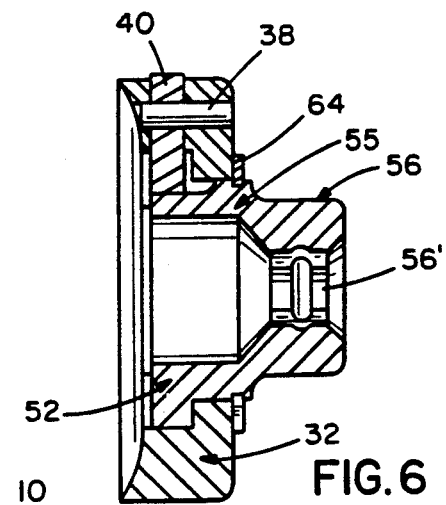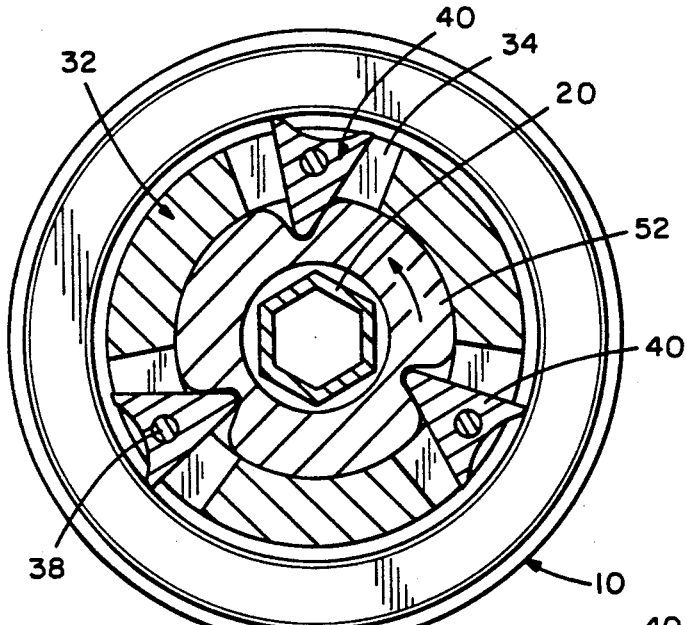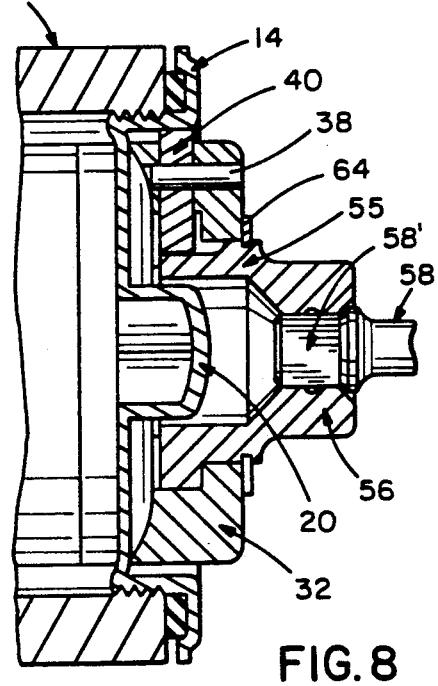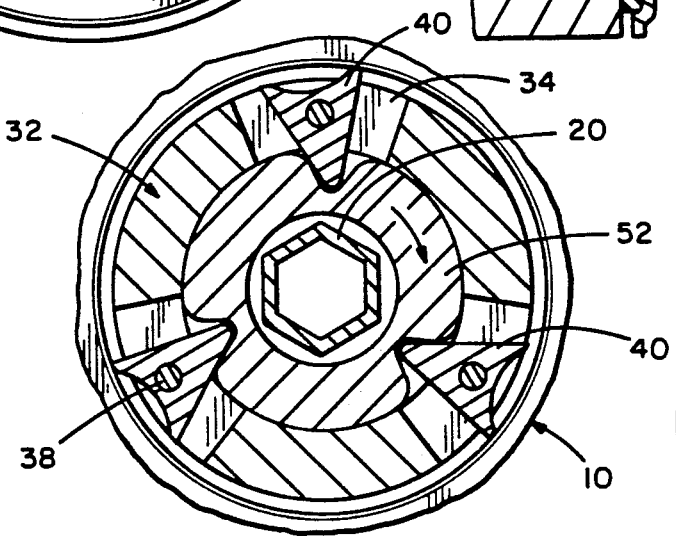

5,129,291

INTERNAL WRENCH-ADAPTER FOR ROTATING AN OIL-FILTER PLUG

BACKGROUND OF THE INVENTION

The present invention is directed to an internal wrench-adapter for rotating a plug of a housing for an oil filter. In some later-model vehicles, an oil filter is housed in a separate housing or casing, which casing has a closure cap or plug that is screwed onto the casing. This type is typically called an "in-the-pan" cannister oil filter. When it is desired to replace the oil filter, the plug is unscrewed from the casing, and a new oil filter inserted. Thereafter, the plug is screwed back on. The plug is conventionally rotated by gripping with a conventional wrench or pliers the hexagonally-shaped projection on the exterior surface of the plug. However, since the hexagonal-shaped projection projects from a recessed surface face of the plug, the projection is hard to grip and, over time, becomes worn and misshapen, making it even more difficult for a conventional hex-head wrench or tool to grip and turn it.

Internal wrenches are well-known. One such wrench is shown in U.S. Pat. No. 2,800,043—Young, in which three, arcuately spaced-apart, pivotal jaw-members are rotated in one direction or the other for gripping an internal diameter tube via an inner rotatable actuator. Initial rotation of the inner rotatable actuator causes the jaws to first rotate in a respective direction until they frictionally engage the internal diameter. Further rotation is then translated into rotation of the tube itself, whereby the greater torque applied to the actuator, the greater frictional engagement of the jaw-members with the internal diameter of the tube. The present invention has adapted such an internal wrench to the specific case of the "in-the-pan" cannister oil plug.

SUMMARY OF THE INVENTION

It is the primary objective of the present invention to provide an internal wrench-adapter for specific use for rotating an in-the-pan cannister oil-filter plug without the need of contacting the hitherto-used hex-shaped projection.

The wrench-adapter of the invention has a tubular main housing that is telescopingly received in the plug, with a portion of the main housing projecting outwardly of the plug. A plurality of pivotally mounted jaw-members are mounted in the outer circumferential surface of the main housing, with each having a portion projecting into the hollow interior of the main housing, and a portion projecting away. An actuator-member causes partial rotation of the jaw-members relative to the main housing in both the clockwise and counterclockwise directions, in order to bring one of the sharpened corners of each jaw-member into contact with the annular interior surface of the main housing of the plug. The actuator-member has a central hollow interior for receiving therein the hex-head projecting from the recessed front surface of the plug.

BRIEF DESCRIPTION OF THE DRAWINGS

The invention will be more readily understood with reference to the accompanying drawing, wherein:

FIG. 1 is a perspective view showing the wrench-adapter of the invention in association with a casing for an in-the-pan oil filter for rotating the plug thereof;

FIG. 2 is a top plan view of the tool of the invention;

FIG. 3 is a side elevational view thereof;

FIG. 4 is an assembly view thereof, in perspective;

FIG. 5 is a cross-sectional view taken along line 5—5 of FIG. 3;

FIG. 6 is a cross-sectional view taken along line 6—6 of FIG. 2;

FIG. 7 is a cross-sectional view similar to FIG. 5, but showing the tool of the invention rotated in a first direction for unscrewing the oil-filter plug;

FIG. 8 is a cross-sectional, elevational view of the tool of the invention shown positioned in a plug for operative engagement therewith; and FIG. 9 is a cross-sectional view similar to FIG. 5, but showing the tool of the invention rotated in a second direction for screwing on the oil-filter plug.

DETAILED DESCRIPTION OF THE INVENTION

Referring now to the drawings in greater detail, in FIG. 1 there is shown a conventional, cylindrical, oil-filter casing 10 for the "in-the-pan" type of cannister oil filters. The holder 10 has a main casing 12 in which an oil filter is placed, and a screw-on plug or cover member 14. The plug 14 has a tubular main body portion 16 defining exterior threads on the outer circumference thereof, as best seen in FIG. 8, by which the plug is screwed onto the end of the casing 12. The plug has an annular flange 18 projecting from the outer circumference of the tubular main body portion 16 at its distal end, again as best seen in FIG. 8. The front or outwardly-directed surface face 16' of the main body portion 16 is recessed from the annular flange 18; i.e., the surface face 16' is contained in a plane spaced from a plane containing therein the outwardly-directed surface of the annular flange, which outward direction faces away from the casing 12. Projecting from the middle portion of this recessed surface face 16' is a hexagonally-shaped head or projection 20, which is designed to be gripped by a similarly shaped socket wrench, or other tool, by which the plug may be rotated for removing the plug from, and replacing it back on, the casing 12. Owing to the recessed nature of the surface face 16', it is difficult to access the hexagonally-shaped head, especially with a tool such as a pliers or adjustable wrench. Over time, the surfaces of head 20 become mutilated, and the shape thereof resembles more a circle than a hexagon, which makes it extremely difficult to rotate the plug thereby, and effectively prevents the use of a socket wrench, and even pliers. To overcome this problem, the wrench-adapter 30 of the invention obviates the need for using the head 20 for turning the plug, and instead utilizes the internal annular surface 14' of the main body portion, which internal annular surface is positioned outwardly from the recessed surface face 16'. By utilizing the internal annular surface, the condition or state of the head 20 becomes completely irrelevant.

The tool 30 is best seen in FIGS. 2-6, and comprises a circular housing 32 that has three, equally spaced-apart, arcuate slots or openings 34 formed in the outer, circumferential surface 32'. Three holes 36 for pivot-pins 38 are provided on the upper surface 32'', each hole being associated with one arcuate opening and being centered with respect thereto, as clearly seen in FIG. 4. Three rotatable or pivotal, tooth-shaped jaw-members 40 are rotatably mounted by the three pivot-pins, with each jaw-member having a hole 40' for receiving a respective pivot-pin. Each jaw-member 40 is mounted in a respective arcuate opening 34, so that a rear portion of each jaw-member extends into the interior of the housing 32, and a front portion projects outwardly of the outer circumferential surface 32' thereof. The front portion of each jaw-member 40 defines a pair of sharpened corners 42, 44, which alternately and frictionally grip against the interior annular surface 14', depending upon which direction the tool 30 is rotated. The two sharpened corners are connected by a concave-shaped or arcuate, exterior surface 46. Rotatably mounted in the interior of the housing 32 is an actuator-member 50 comprising a substantially tubular, contact-element 52 defining three V-shaped cutouts or recesses 54, in which are received the corresponding shapes of the rear portions of the three jaw-members, in the manner best seen in FIG. 5. Thus, each jaw-member has its V-shaped rear portion nestled in a respective V-shaped cutout 54, whereby upon rotation of the actuator-member in one direction or the other, each jaw-member will be caused to rotate also about the respective pivot-pin 38, but in the opposite direction to that of the actuator. Such rotation causes one of the sharpened corners 42, 44 to project more outwardly from the circumferential surface 32', by which the one sharpened corner will contact the interior, annular surface 14', as seen by comparing FIGS. 7 and 9. Rotation of the three jaw-member continues until the one sharpened corner of each jaw-member contacts the interior surface; thereafter, continued rotation of the actuator-member 50 causes the interior, annular surface 14' to rotate therewith, which, of course, rotates the entire plug 14. It is noted that the greater the torque applied to the actuator element, the greater the force applied to the one sharpened corner to cause it to frictionally engage the interior annular surface, such principal, however, being known in the art.

The actuator-member 50, in addition to the contact-element 52, has a smaller-diameter central section 55, which central section 55 terminates into an even smaller-diameter terminal section 56. The central section 55 and the contact-element 52 define hollow interiors that are substantially circular. The diameter of each hollow interior is greater than that of the hexagonally-shaped head 20, so that the head 20 may be received therein when the tool-adapter 30 is applied to the plug, whereby the head is accommodated and does not pose any obstruction to the use of the tool-adapter 30. The terminal section 56 has a substantially square-shaped interior opening 56', as best seen in FIG. 2, whereby a conventional socket wrench 58 with male head 58' may be used for rotating the entire actuator-member 50, and, therefore, the plug 14.

A split ring 64 mounts the actuator-member 50 to the main housing, the split ring being nestled in an annular groove 60' formed in the circumferential surface of the central or intermediate section 55 adjacent its end, in close juxtaposition to the terminal section 56. The split ring prevents removal of the actuator-member from the main housing in the downward direction when viewing FIG. 4, and rotates along with the actuator-member 50 for the small arcuate degree of rotation thereof relative to the main housing, until one or the other of the sharpened corners 42, 44 contacts the interior surface of the main housing, as above-described. A bottom cover-plate 70 is secured to the contact-element by rivets 72, which prevents the actuator-member form being removed from the main housing in the upward direction, when viewing FIG. 4. The cover-plate also closes off the bottom of the contact-element 52, so that the rear portions of the jaw-members 40 are not exposed, with this cover-plate having approximately the same radius as the contact-element 52. The cover-plate 70 rotates with the cover element for the fraction of the turn thereof relative to the main housing 32. The cover-plate also defines an enlarged interior opening through which the head 20 projects, as seen in FIG. 8, which figure shows the tool 30 in place in a plug 14.

In using the tool 30, it is placed in the plug in the manner shown in FIG. 8. The head 20 is received through the inner openings of the cover-plate 70, the contact-element 52 and central section 55. At this point, the jaws of the tool are as shown in FIG. 5. Thereafter, the terminal section 56 is rotated by a socket wrench 58 either in the counterclockwise direction in order to unscrew the plug, as shown in FIG. 7, or in the clockwise direction, in order to screw the plug back on, as shown in FIG. 9, with one or other of the corners 42, 44 gripping the interior surface of the plug. Until the sharpened corner 42 or 44 contacts the interior surface, the actuator-member 50 rotates relative to the main housing. When the sharpened corner 42 or 44 bites into the interior surface of the main housing, then both the actuator-member and the main housing are rotated together, along with the plug itself. While a male socket wrench 58 has been shown, one may use a female socket, with the terminal section 56 being appropriately shape to telescopingly receive the female socket thereabout.

While a specific embodiment of the invention has been shown and described, it is to be understood that numerous changes and modifications may be made therein without departing from the scope, spirit and intent of the invention as set forth in the appended claims.

What I claim is:

1. An oil filter plug comprising a main body portion having a first end that is receivable in a casing and a second end, and having exterior screw threads, a recessed front surface, a head member projecting from the center of said recessed front surface which the plug may be rotated, and an annular flange member about said second end, said front surface being spaced from said second end so as to define a front hollow interior of said main body portion from said second end to said recessed front surface, said front hollow interior having an interior annular surface, the improvement comprising:

a wrench-adapter partially telescopingly received in said front hollow interior for rotating said plug via said interior annular surface;

said wrench-adapter comprising a circular, tubular main housing having a hollow interior, an outer circumferential surface, an interior end surface and an exterior end surface; said main housing being at least partially telescopingly received in said front hollow interior so that said interior annular surface surrounds at least a portion thereof;

said wrench-adapter also comprising a plurality of pivotally mounted jaw-members partially rotatable in the clockwise and counterclockwise directions, said outer circumferential surface of said main housing having a plurality of arcuately spaced-apart slots for receiving said plurality of jaw-members, and means for pivotally mounting said jaw-members in said slots; each said jaw-member having an interior-extending portion projecting into the hollow interior of said main housing, and an exterior-extending portion projecting away from said circumferential surface; said exterior-extending portion comprising a pair of oppositely-disposed sharpened corners;

said wrench-adapter further comprising an actuator-member for causing the partial rotation of said jaw-members relative to said main housing in both the clockwise and counterclockwise direction, said actuator-member comprising a circular contact-element having an outer circumference surface, a plurality of cooperating means formed in said outer circumferential surface of said contact-element for mating with said interior-extending portions of said jaw-members; said actuator-member being at least partially telescopingly mounted in said main housing for partial rotation relative to said main housing, so that upon rotation of said actuator-member, said actuator-member causes the pivotal rotation of said jaw-members, in order to bring one of the sharpened corners of each said jaw-member into contact with said interior annular surface of said main body portion of said plug;

said contact element having a central hollow interior for receiving therein said head projecting from said recessed front surface of said plug;

said actuator-member further comprising a circular, intermediate section extending from said contact-element; said intermediate section also having a hollow interior into which may extend said head projecting from said recessed front surface, and a terminal section extending from said intermediate section, said terminal section having means for being gripped by a tool for rotating said actuator-member, said terminal section projecting outwardly of said front hollow interior of said main body portion of said plug;

said actuator-member further comprising a circular, bottom cover-plate secured to said contact-element for partial rotation therewith, said cover-plate having an inner opening through which passes said head projecting from said recessed front surface of said plug; said contact-element having a bottom surface facing opposite to said intermediate section, said cover-plate being connected to said bottom surface, whereby said cover-plate prevents the removal of said actuator-member from said main housing by contact between said jaw-members and said cover-plate.

2. The improvement according to claim 1, wherein said bottom cover-plate and said interior end surface of said main housing are in abutting contact against said recessed front surface of said plug.

3. The improvement according to claim 1, wherein said actuator-member further comprises a split-ring, said intermediate section having an outer circumferential annular groove in close juxtaposition to said terminal section, said ring being positioned in said annular groove; said ring having a diameter greater than the diameter of said hollow interior of said main housing of said wrench-adapter, whereby said ring prevents the removal of said actuator-member from said main housing of said wrench-adapter.

4. The improvement according to claim 3, wherein each said jaw-member is tooth-shaped, said exterior-extending portion being wider than said interior-extending portion; said exterior-extending portion comprising a concave outer surface interconnecting said sharpened corners.

5. A wrench-adapter for use in rotating a plug of a housing for an in-the-pan type of oil filter, comprising:

a circular, tubular main housing having a hollow interior, an outer circumferential surface, an interior end surface and an exterior end surface; said main housing being at least partially telescopingly receivable in a hollow interior of a plug of a casing for an oil filter;

said wrench-adapter also comprising a plurality of pivotally mounted jaw-members for partial rotation in the clockwise and counterclockwise directions, said outer circumferential surface of said main housing having a plurality of arcuately spaced-apart slots for receiving said plurality of jaw-members, and means for pivotally mounting said jaw-members in said slots; each said jaw-member having an interior-extending portion projecting into the hollow interior of said main housing, and an exterior-extending portion projecting away from said circumferential surface; said exterior-extending portion comprising a pair of oppositely-sharpened corners;

said wrench-adapter further comprising an actuator-member for causing the partial rotation of said jaw-members relative to said main housing in both the clockwise and counterclockwise directions, said actuator-member comprising a circular contact-element having an outer circumferential surface, a plurality of cooperating means formed in said outer circumferential surface of said contact-element for mating with said interior-extending portions of said jaw-members; said actuator-member being at least partially telescopingly mounted in said main housing for partial rotation relative to said main housing, so that upon rotation of said actuator-member, said actuator-member causes the pivotal rotation of said jaw-members, in order to bring one of the sharpened corners of each said jaw-member into contact with an annular interior surface of a plug;

said contact element having a central hollow interior for receiving therein a head of a plug of an in-the-pan type of oil filter;

said actuator-member further comprising a circular, intermediate section extending from said contact-element; said intermediate section also having a hollow interior, and a terminal section extending from said intermediate section, said terminal section having means for being gripped by a tool for rotating said actuator-member;

said actuator-member further comprising a circular, bottom cover-plate secured to said contact-element for partial rotation therewith, said cover-plate having an inner opening through which passes the head projecting from the recessed front surface of a plug; said contact-element having a bottom surface facing opposite to said intermediate section, said cover-plate being connected to said bottom surface, whereby said cover-plate prevents the removal of said actuator-member from said main housing by contact between said jaw-members and said cover-plate.

6. The improvement according to claim 5, wherein said plurality of cooperating means comprises a plurality of V-shaped cutouts, each said jaw-member's interior-extending portion being similarly shaped for reception in a respective said cutout.

7. The improvement according to claim 5, wherein said actuator-member further comprises a split-ring, said intermediate section having an outer circumferential annular groove in close juxtaposition to said terminal section, said ring being positioned in said annular groove; said ring having a diameter greater than the diameter of said hollow interior of said main housing of said wrench-adapter, whereby said ring prevents the removal of said actuator-member from said main housing of said wrench-adapter.

8. The improvement according to claim 7, wherein each said jaw-member is tooth-shaped, said exterior-extending portion being wider than said interior-extending portion; said exterior-extending portion comprising a concave outer surface interconnecting said sharpened corners.

* * * * *